UNITED STATES PATENT OFFICE.

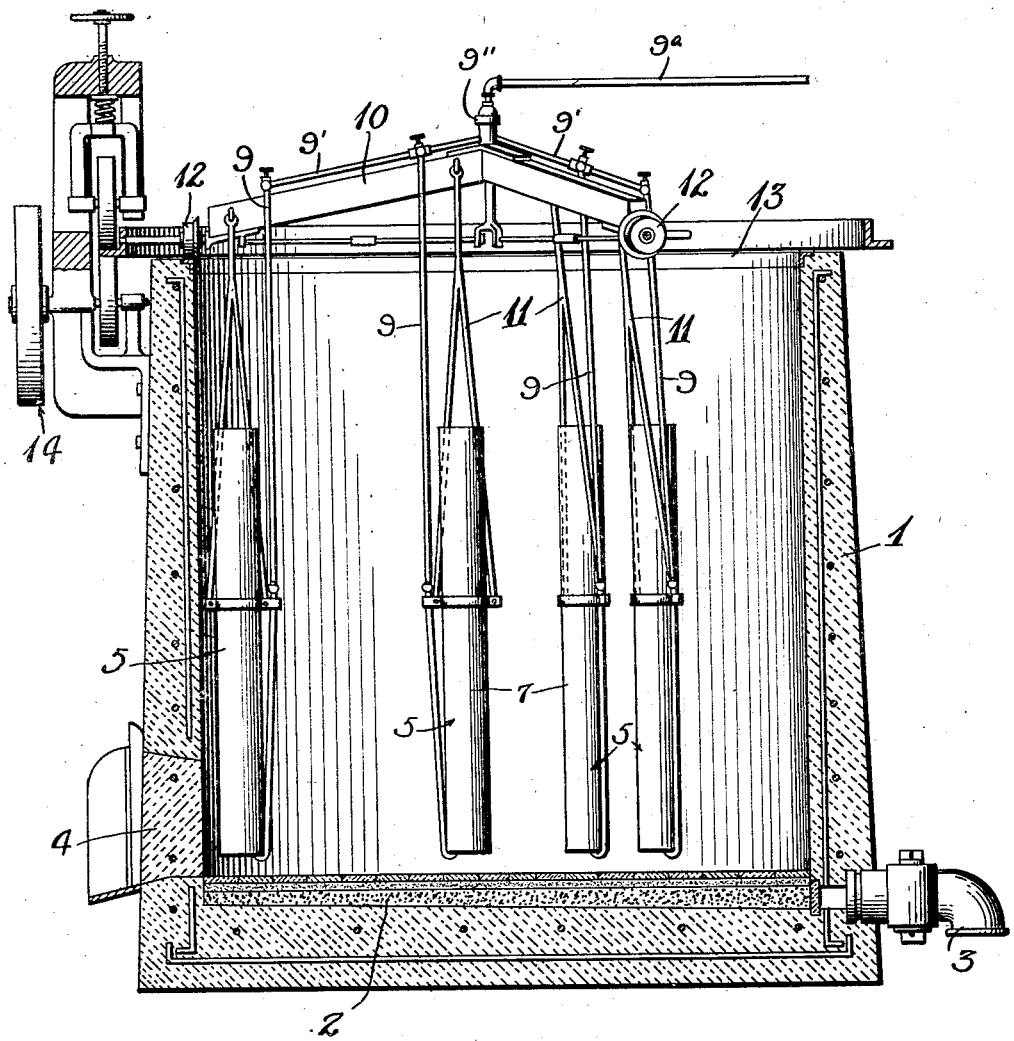

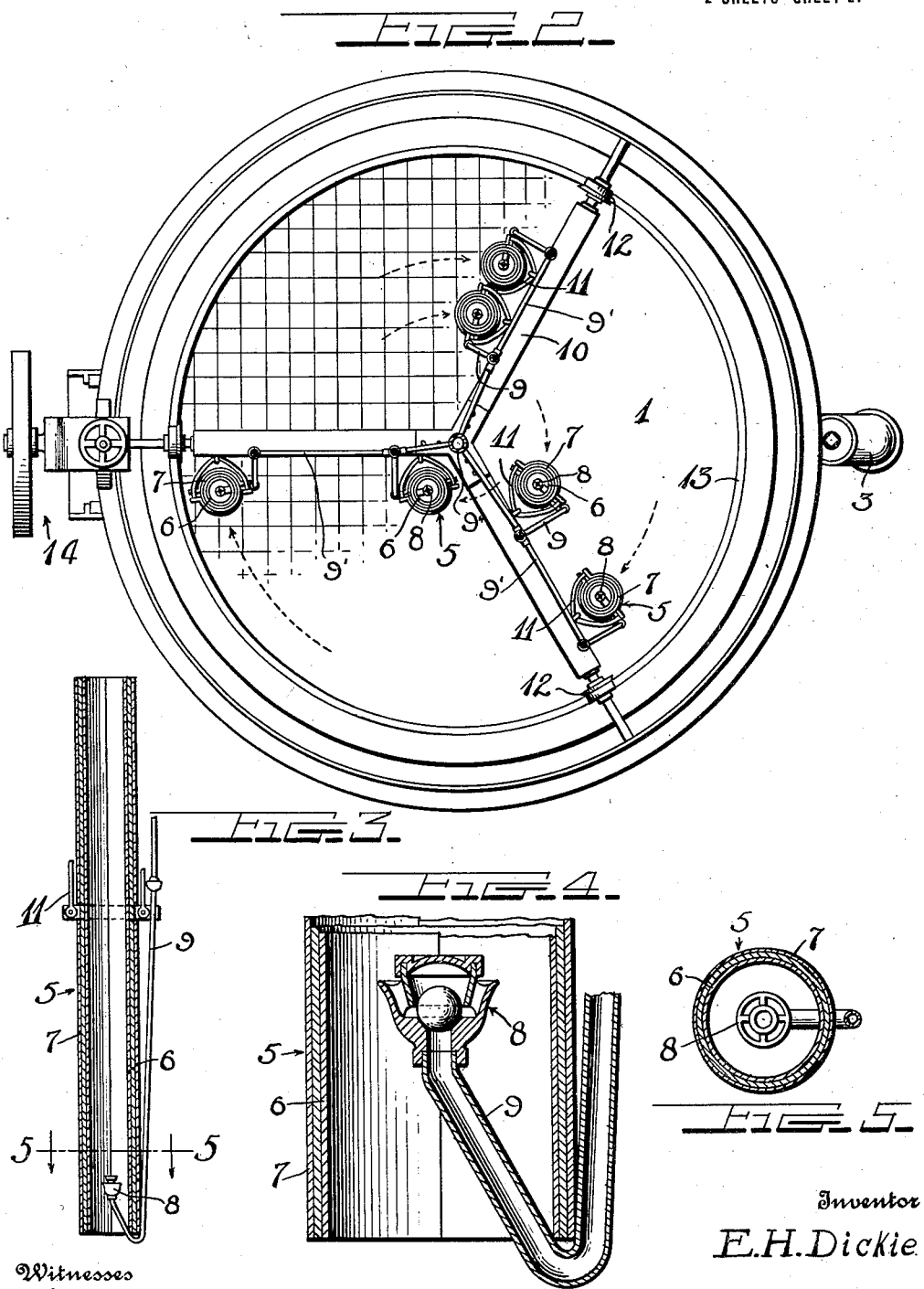

EDWARD HALE DICKIE, OF GOLDROAD, ARIZONA.

DESULFURIZING METHOD FOR TREATING REFRACTORY ORES.

1,177,396.     Specification of Letters Patent.     Patented Mar. 28, 1916.

Application filed January 25, 1915. Serial No. 4,233.

*To all whom it may concern:*

Be it known that I, EDWARD H. DICKIE, a citizen of the United States, residing at Goldroad, in the county of Mohave and State of Arizona, have invented certain new and useful Improvements in Desulfurizing Methods for Treating Refractory Ores; and I do declare the following to be a full, clear, and exact description of the invention, such as will enable others skilled in the art to which it appertains to make and use the same.

My invention relates to improvements in methods for accomplishing preliminary treatments of gold, silver, platinum and other ores wherein sulfur is found in combination with any of the above metals, or in combination with any of the base metals. Actual experience has taught that little or no recovery of gold, silver, or platinum values is made by cyanidation or kindred processes, unless such ores are given a preliminary treatment such as roasting or a desulfurizing treatment. The roasting process has proved ineffective in many ways and it is to provide a new and novel method for removing the sulfur from the ores that I have primarily provided the invention to be hereinafter more clearly described and explained.

In describing my invention I shall refer to the accompanying drawings, in which:

Figure 1 designates a vertical section of a preliminary treatment tank equipped with mechanism for carrying out the process; Fig. 2 is a top plan view of the tank; Fig. 3 is a vertical section through one of the pneumatic agitators. Fig. 4 is an enlarged vertical section through the lower end of one of said agitators; and Fig. 5 is a horizontal section on line 5—5 of Fig. 3.

I shall first refer to the drawings giving a brief description of one form of apparatus which may well be employed for effecting the desulfurizing treatment above suggested. In these drawings the numeral 1 designates a preliminary treatment tank preferably formed of reinforced cement and having a suitable filter 2 at its bottom, a spigot 3 being provided for removing liquids which have been drained through said filter. The tank may further be equipped with an appropriate form of door 4 at its lower end.

Standing upright within the tank 1 is a plurality of pneumatic agitators 5, these agitators being here shown in the form of upright tubes (see more particularly Fig. 3) having linings 6 of aluminum and coverings 7 of such material. Each of the agitators 5 is further equipped with a nozzle 8 located within its lower end and carried by an air tube 9 through which compressed air is forced, all of these nozzles being so designed as to force any solution within the agitators outwardly against the lining 6 as will be evident by inspection of the illustration.

The agitators 5 may be carried and operated by any appropriate means, this means being here shown in the form of a tripod 10 from which the agitators are suspended by hangers 11, the arms of the tripod being provided with rollers 12 which run upon a track 13 at the top of the tank 1. For rotating the tripod 10, the means indicated at 14 in Figs. 1 and 2 may be employed, or any other suitable driving mechanism may be provided, it being only necessary that the numerous agitators 5 be moved through a solution deposited in the tank.

As most clearly seen in Fig. 1, the pipes 9 for furnishing compressed air to the nozzles 6 are in valved communication with a trio of other pipes 9' radiating from a central air supply coupling 9'' located at the center of the tripod 10, compressed air being fed to this coupling by a supply pipe 9ª.

The apparatus thus described or an analogous disposition of parts may be employed, but since no unnecessary parts of the device are located within the tank, the structure illustrated in the drawings is preferable.

In effecting the process, the ores to be treated are first ground to a mesh ranging from a 150 to a 200 grade and such ground ore is mixed with a caustic soda solution, this mixing being either done in the tank 1 or at some remote point. The liquid mixture, at any rate, is at one time or another deposited in the tank 1 and by the mechanism 14, or its equivalent, the tripod 10 is rotated to cause the pneumatic agitators 5 to move through the solution. At the same time, compressed air is admitted through the pipe 9ª to be discharged upwardly from the nozzles 8, thus creating a suction within the agitators and causing the solution to move upwardly therein, thus causing such solution to forcibly contact with the aluminum lining 6 which chemically acts thereon in a manner to be more clearly explained, Furthermore, the nozzles 8 direct the blasts of air outwardly, thus more forcibly projecting the liquids against the lining 6, thereby producing better results. While this operation is taking place within the agitators 5, it will be understood that the aluminum coverings 7 thereof are being forced against and through the solution in the tank, thus also chemically acting thereon.

It is to be noted that by the structure above described, the solution within the tank is simultaneously aerated, agitated, and subjected to metallic aluminum, these simultaneously occurring actions tending to effectively accomplish the desulfurization of the ore being treated. This process, I shall endeavor to cover as fully as possible both in description and by equation in the following.

It is to be remembered first, that ores of gold and silver that carry different metal and mineral contents in combination with sulfur, must necessarily receive a treatment suitable to the ore contents for its proper reduction. As an example: An ore that contained lead sulfate would be refractory because the gold and silver would be coated with the sulfate of lead. In this case, an addition of an alkaline earth or metal acetates would be added to the preliminary treatment solution. Thus, sodium acetate will dissolve lead sulfate, the lead will react with the sulfids and form lead sulfid. Again the caustic soda reacts with the lead sulfates which are changed to lead hydroxid, the readjustment causing the coating to become permeable. Similarly, many other compounds are changed to the hydroxids. Organic matter is removed or oxidized more readily by aeration of the solution where sodium hydroxid is present. The oxidation of the ferrous compounds is rapid in a caustic soda solution in the presence of oxygen, obtained by the aeration given the solution in the apparatus (i. e., the pneumatic agitators).

Potassium acetates dissolve metallic sulfates and because of the affinity for those sulfates, tend to hasten the change of sulfids to sulfates in the presence of oxygen. It will hasten any action which will bring about the solution of any metallic substance with which it will unite. Therefore, in practice, I use a caustic soda solution, NaOH. Certain sulfid ores are desulfurized by this solution in the presence of metallic aluminum producing sodium sulfid which remains in solution and is drained from the ore. Ores containing the sulfates and sulfids of lead, zinc, antimony, arsenic, etc., are desulfurized by a caustic soda solution in the presence of metallic aluminum and zinc alloy, or by the addition of an acetate of an alkali earth or metal to the solution. The desulfurizing is caused by the action of the chemical on the sulfates and sulfids as well as the formation of hydrogen gas by the action of caustic soda on metallic aluminum in the presence of the sulfates and sulfids of the metal contents of the ore. Again hydrogen gas is evolved where zinc acetate is used in the solutions, the action of the latent acid contents of the ore upon the zinc setting the gas free. The action of hydrogen gas in combination with the reducing action of the acetate earths or metals desulfurizes the refractory ores and prepares such ores for the actual treatment by cyaniding or other kindred processes, after first draining the solution from the ores.

The reduction of sulfur metal contents of an ore is presumably as follows when treated by NaOH and 2Al:

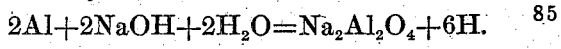

$$2Al + 2NaOH + 2H_2O = Na_2Al_2O_4 + 6H.$$

From the foregoing description, when considered in connection with the accompanying illustration, it will be seen that a comparatively simple process has been provided for accomplishing the object of the invention, yet that such process will be highly efficient in operation and will readily decompose any prevalent sulfur or sulfur compounds in most forms of refractory ores.

I claim:

The method of treating refractory ores consisting in mixing the finely ground ore with a solution of caustic soda and potassium acetate, agitating the mixture in the presence of a metallic value precipitant, and finally removing the solution.

In testimony wherof I have hereunto set my hand in presence of two subscribing witnesses.

EDWARD HALE DICKIE.

Witnesses:
G. A. Stoney,
B. C. Taylor.